3,013,372
BRUSH CYCLE
Lawrence Hobart Basham, 1440 17th St., Sarasota, Fla., assignor of one-half to William Hohman, Sarasota, Fla.
Filed Aug. 19, 1959, Ser. No. 834,767
2 Claims. (Cl. 56—25.4)

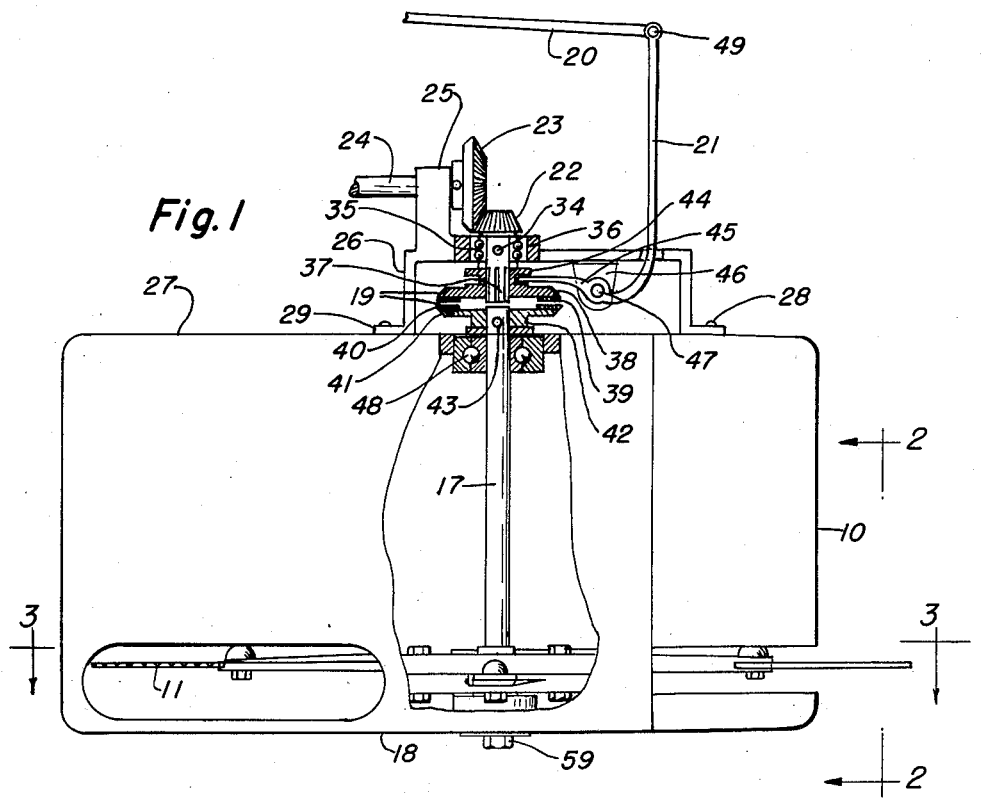

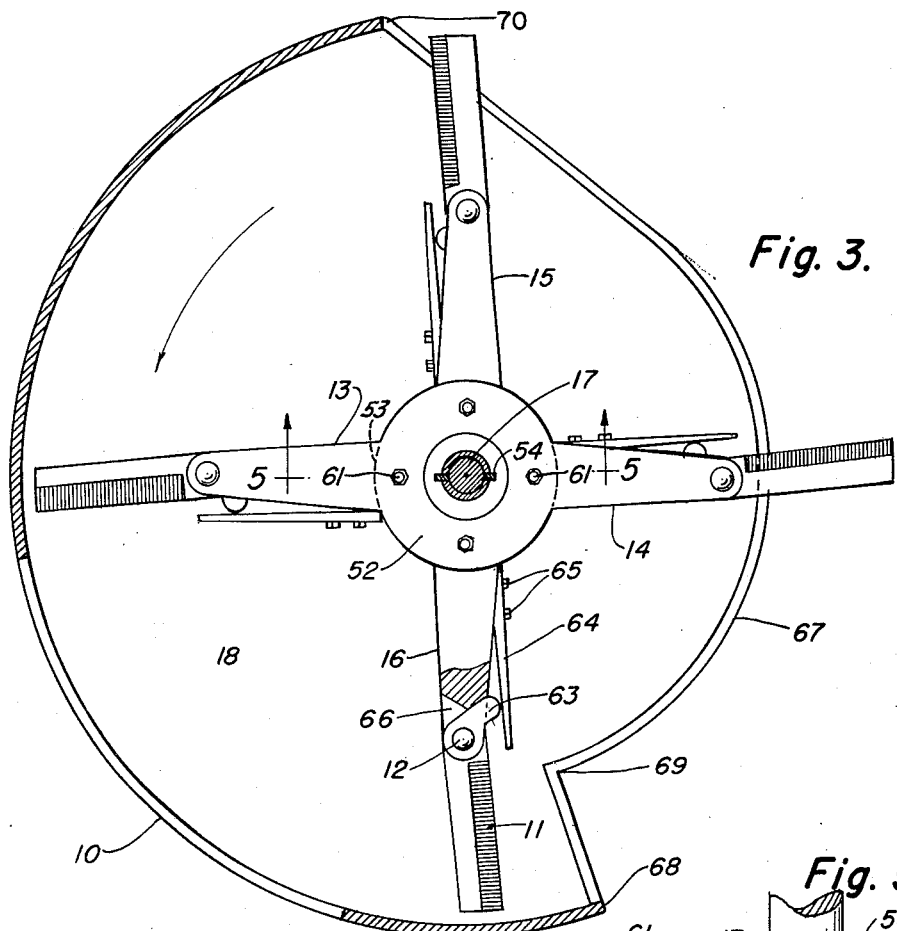
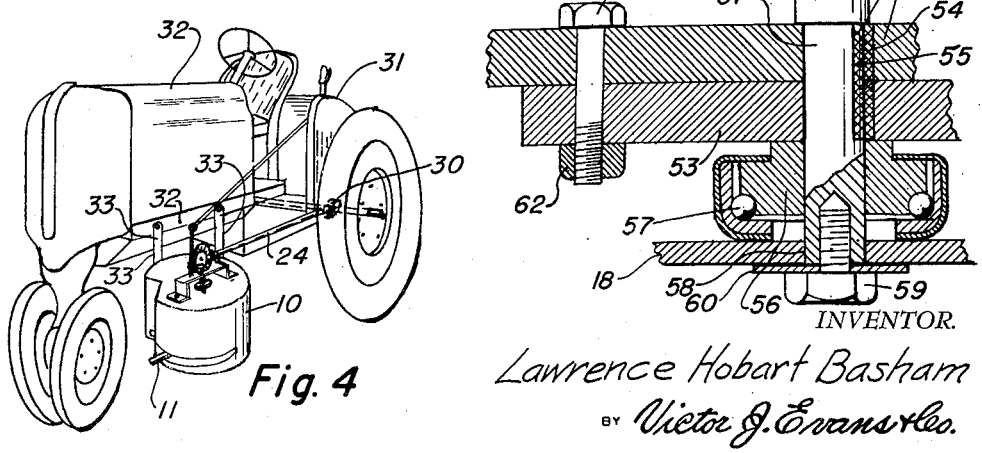

This invention relates to rotary mowers or cutting attachments designed to be mounted on tractors particularly for use on farms, golf courses and the like, and in particular a vertically disposed substantially cylindrical housing having horizontally positioned cutting blades in the lower end and suspended from a tractor housing for cutting brush, briars, vines, and the like on fence rows or in fields or the like.

The purpose of this invention is to provide an attachment in the form of a power mower whereby brush, briars, small trees and the like may be cut by a tractor.

Various types of mower attachments have been provided for tractors and the like. However, although cutting blades have been provided for weeds, brush, and the like, conventional blades of this type are not of sufficient strength to clean fence rows where it is necessary to cut small trees, roots, heavy briars, and the like. With this thought in mind this invention contemplates a cutting attachment mounted on and suspended from a tractor housing and operatively connected to a power take-off of the tractor whereby substantially all trash and growth may be removed from fence rows, fields, and the like.

The object of this invention is, therefore, to provide a cutting attachment for a tractor in which the cutting elements are of sufficient strength to cut small trees, heavy briars, and other trash.

Another object of the invention is to provide a cutting attachment for a tractor in which the attachment may be mounted on tractors of different manufacturers.

A further object of the invention is to provide a cutting attachment for a tractor in which the attachment is capable of cutting small trees, heavy briars, roots and the like and in which the attachment is of a simple and economical construction.

With these and other objects and advantages in view the invention embodies a substantially cylindrical housing, means for attaching the housing to the housing of a tractor, cutting blades mounted to rotate in a horizontal plane in the lower end of the housing, and means for actuating the blades from a power take-off of a tractor upon which the housing is mounted.

Other features and advantages of the invention will appear from the following description taken in connection with the drawings, wherein:

FIGURE 1 is a side-elevational view of the tractor cutting attachment with parts broken away and with parts shown in sections, showing in particular transmission elements on the upper part of the cutter housing.

FIGURE 2 is a side-elevational view of the lower part of the cutter housing showing the cutting blades therein, the view being taken on line 2—2 of FIG. 1 with the upper part of the housing being broken away and the housing being shown on an enlarged scale.

FIGURE 3 is a sectional plan through the lower part of the cutter housing taken on line 3—3 of FIGURE 1 with the upper part of the housing broken away for the purpose of illustrating the mounting of the cutting blades.

FIGURE 4 is a view showing the cutter housing suspended from the housing of a tractor.

FIGURE 5 is a cross-sectional view taken through the lower end of the cutter housing on the line 5—5 of FIG. 3 for the purpose of illustrating the mounting of the cutting blade carrying arms on the lower end of the driving shaft that is rotatably mounted in the housing, the parts being shown on an enlarged scale and parts of the arms and housing being broken away.

Referring now to the drawings wherein like reference characters denote corresponding parts the improved brush cycle of this invention includes a substantially cylindrical housing 10, cutting blades 11 pivotally mounted by pins 12 on pairs of arms 13 and 14, and 15 and 16, carried on the lower end of a shaft 17, a base 18 of the housing, a clutch 19 actuated by a handle 20 through a clutch lever 21 and bevel gears 22 and 23 for driving the cutting blades from the power take-off of a tractor.

The gear 23 is mounted on a power take-off shaft 24 rotatably mounted in a bearing 25 of a bracket 26 mounted on the upper end 27 of the housing 10 by bolts 28 which extend through flanges 29 on the lower ends of the bracket, and the shaft 24 extends to a power take-off 30 of a tractor 31, as shown in FIGURE 4.

The housing 10 is suspended from the tractor framing 32 by bars 33 and it will be understood that the bars may be mounted in suitable positions whereby the housing may be suspended from tractors of different manufacturers.

The lever gear 23 meshes with a bevel pinion 22 on the upper end of a sub-shaft 34 mounted in a bearing 35 in a hub 36 of the bracket 26 and the lower end of the sub-shaft 34 is provided with splines 37 on which an upper disc 38 of the clutch 19 is positioned. The disc 38 is provided with a friction ring 39 and a similar ring 40 is carried by a disc 41, a hub 42 of which is secured to the upper end of the shaft 17 by key 43. The disc 38 is provided with a collar 44 and a yoke 45 on the lower end of the clutch lever 21 straddles the collar whereby the upper disc 38 is actuated by the handle 20. The clutch lever 21 is pivotally mounted in a bearing 46 depending from the bracket 26 by a bolt 47. The upper part of the shaft 17 is rotatably mounted by a bearing 48 in the upper end 27 of the housing 10. The handle 20 is pivotally mounted on the upper end of the clutch lever 21 by a bolt 49.

The lower end of the shaft 17 is provided with a shoulder 50 from which a sub-shaft 51 extends and, as illustrated in FIGURE 5, discs 52 and 53 of the arms 13 and 14, and 15 and 16, are secured against the shoulder 50. The discs 52 and 53 are keyed to the sub-shaft 51 by a key 54 that extends into a slot 55 in the sub-shaft.

The discs 52 and 53 are positioned between the shoulder 50 and an inner race 56 of a ball bearing 57 on the lower end of the sub-shaft 51. The lower end of the sub-shaft extends through an opening 58 in the base or bottom 18 of the housing 10 and a cap screw 59 is threaded in the lower end of the sub-shaft 51 for securing the parts in assembled relation, as shown in FIGURE 5. A washer 60 is positioned between the head of the cap screw 59 and the lower surface of the base 18 of the housing. The discs 52 and 53 of the blade carrying arms are secured together by bolts 61 on the lower ends of which are lock nuts 62.

The blades 11, which are provided with saw-tooth cutting edges are provided with knobs 63 that are positioned to be engaged by springs 64 secured to the edges of the blade carrying arms by screws 65, whereby the cutting blades are retained by the springs in extended positions and wherein the blades may yield upon striking a fixed obstruction. The blades are secured in slots 66 in the ends of the blade carrying arms.

As illustrated in FIGURE 3 the housing is provided with a cut-away portion 67 extended from a point 68 inwardly to a point 69 and tapering outwardly from the surface 67 to a point 70 whereby the blades are only exposed in the cut-away portion or between the points 68 and 70. With the housing stationary the operating position of the blades is only at the forward side, as illustrated in FIGURE 4.

With the parts mounted as illustrated and described the housing 10 is suspended from a tractor housing 32, as illustrated in FIGURE 4, and with forward movement of the tractor the blades cut brush, weeds, briars and small trees as the tractor moves along a fence row or over other areas of a field or the like and with the blades mounted and supported in this manner relatively large bushes, roots, and the like may be cut thereby.

It will be understood that modifications, within the scope of the appended claims, may be made in the design and arrangement of the parts without departing from the spirit of the invention.

What is claimed is:

1. In a rotary cutter for a tractor, the combination which comprises a vertically disposed substantially cylindrical housing, a vertically disposed shaft rotatably mounted in the housing, upper and lower discs having a pair of radially disposed cutting arms on each disc mounted on said vertically disposed shaft in fixed relation thereto and within said housing, cutting blades pivotally mounted on the outer ends of each of said arms and positioned to travel in a horizontal plane in the lower part of the housing, said housing having cut-away portions through which the blades extend, bars secured to the framing of a tractor and said housing for suspending the housing from the tractor, a shaft extended from the housing to the power take-off of the tractor, bevel gears operatively connecting the shaft extended from the power take-off of the tractor to the vertically disposed shaft rotatably mounted in the housing, projections on each of said blades and tensioning springs secured to said arms and engaging the projections on said blades.

2. In a rotary cutter for a tractor, the combination which comprises a vertically disposed cylindrical housing, a shaft rotatably mounted in the housing, upper and lower discs having a pair of radially disposed cutting arms on each disc mounted on said vertically disposed shaft in fixed relation thereto and within said housing, cutting blades pivotally mounted on the outer ends of each of said arms and positioned to travel in a horizontal plane, yielding elements in the mounting of the blades, said yielding elements comprising projections on each of said blades and tensioning springs secured to said arms and engaging the projections on said blades, bars extended from the housing for suspending the housing from a tractor, a shaft extended from the housing to the power take-off of the tractor, a bevel pinion mounted on the upper end of the housing, a clutch connecting the bevel pinion mounting to the upper end of the shaft rotatably mounted in the housing, and a bevel gear on the shaft extended from the power take-off of a tractor and positioned to mesh with the bevel pinion, said housing having inwardly extending portions through which the blades extend.

References Cited in the file of this patent

UNITED STATES PATENTS

| | | |
|---|---|---|
| 1,770,091 | Soss | July 8, 1930 |
| 2,566,512 | Bilderbeck | Sept. 4, 1951 |
| 2,576,886 | McCoy | Nov. 27, 1951 |
| 2,803,103 | Kollman | Aug. 20, 1957 |
| 2,859,579 | Peck | Nov. 11, 1958 |
| 2,872,770 | Murphy et al. | Feb. 10, 1959 |
| 2,889,677 | Wood | June 9, 1959 |
| 2,891,369 | Rietz | June 23, 1959 |
| 2,928,223 | Danuser | Mar. 15, 1960 |